July 3, 1962  B. A. SHOOR  3,042,744
TESTING SYSTEM AND INSULATED MOUNTING THEREFOR
Filed Nov. 3, 1958  2 Sheets-Sheet 1
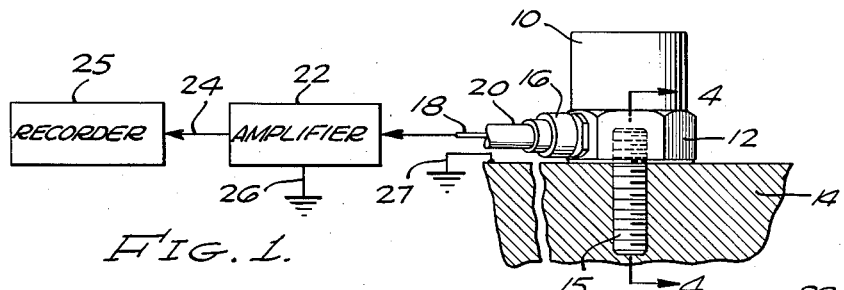
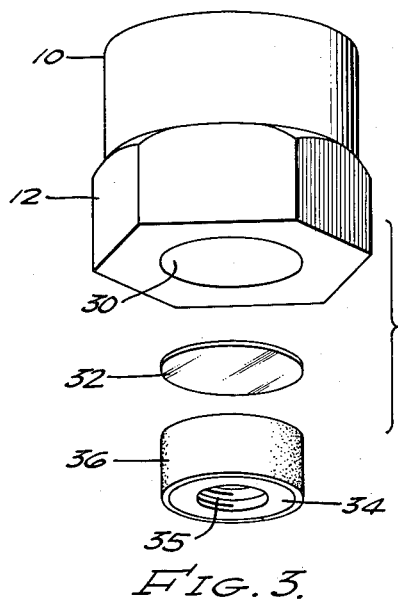
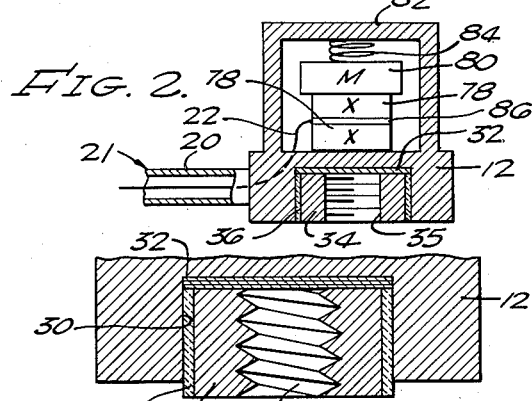
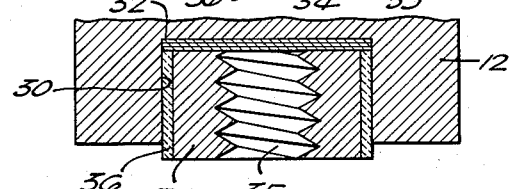
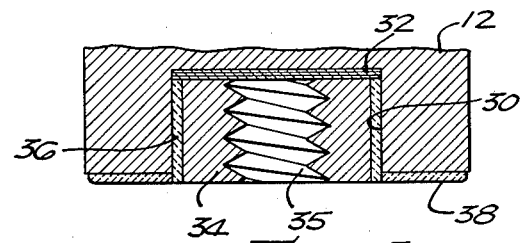
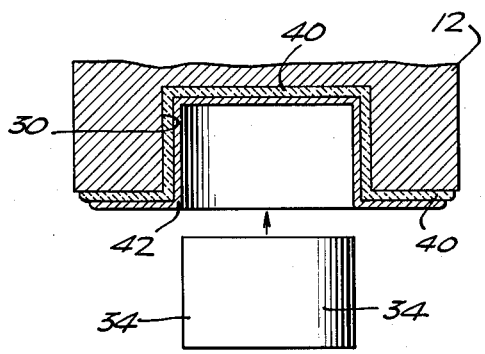
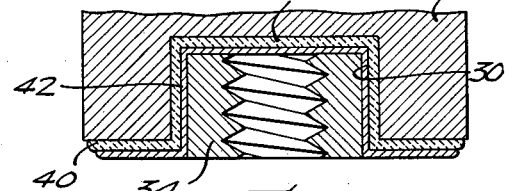
INVENTOR.
BERNARD A. SHOOR
BY
ATTORNEY July 3, 1962   B. A. SHOOR   3,042,744
TESTING SYSTEM AND INSULATED MOUNTING THEREFOR
Filed Nov. 3, 1958   2 Sheets-Sheet 2

INVENTOR.
BERNARD A. SHOOR
BY
ATTORNEY 

United States Patent Office 3,042,744
Patented July 3, 1962

3,042,744
TESTING SYSTEM AND INSULATED MOUNTING THEREFOR
Bernard A. Shoor, Pasadena, Calif., assignor to Endevco Corporation, Pasadena, Calif., a corporation of California
Filed Nov. 3, 1958, Ser. No. 771,579
7 Claims. (Cl. 174—138)

This invention relates to electrical testing equipment, and more particularly to improvements in electromechanical testing apparatus.

It has been found that the sensitivity and reliability of some electrical testing units, such as piezoelectric accelerometers, can be improved immensely if, when mounted on a structure to be tested, such testing unit is electrically insulated from the test structure. If such an accelerometer is employed in measuring the acceleration of a vibrating structure, when such an accelerometer is mounted directly on the housing of the test structure without such insulation, spurious signals frequently occur that detract greatly from the sensitivity and reliability of the test device. For example, if a piezoelectric accelerometer is mounted on a large shaking table or a drop tower employed in the testing of the table, the tower or another object mounted thereon, large voltages that occur in the structure may cause significant ground currents that mask or other wise interfere with the desired accelerometer signals. It has been determined that the adverse effects on such testing equipment that occur under these conditions are not due to signals that are merely induced electro-statically or magnetically in the measuring system, but have their origin in ground loop phenomena.

In any event, the sensitivity and reliability of piezoelectric pickup can be increased by a large factor by electrically insulating the instrument from the metal structure on which it is mounted while maintaining it intimately coupled mechanically thereto.

The general object of the invention is to improve the sensitivity and reliability of electromechanical testing instruments such as accelerometers.

It is a further object of the invention to provide insulating means in a mounting of the indicated character such that all spurious signals, resulting from such causes are eliminated.

I have discovered that, by employing a thin ceramic coating upon some of the parts involved, adequate insulation is readily accomplished, especially where such ceramic coating is effected by high-temperature spraying. This is because such high-temperature spraying produces a hard, compact, and tenacious insulating layer upon the respective elements, and yet accomplishes the thorough electrical insulation required.

It is therefore still another object of the invention to provide insulating mounting means that affords a strong, coherent, mechanical connection between the accelerometer or other test instrument and the motor or other structure whose characteristics are being tested.

Other objects of the invention and the various features of construction thereof will become apparent to those skilled in this art upon reference to the following specification and the accompanying drawings wherein certain embodiments of the invention are illustrated.

In the drawings:

FIGURE 1 is partly a side elevation of a test device in the form of an accelerometer mounted upon a piece of apparatus to be tested or its housing, indicated in section, the accelerometer being shown as connected in series with an amplifier and a recorder;

FIG. 2 is a schematic diagram of an accelerometer to which this invention is applied;

FIG. 3 is an exploded view, in perspective and on an enlarged scale, of insulating elements employed in constructing and insulating a joint or connection of a preferred form of this invention;

FIG. 4 is a vertical section through an assembly produced by the parts of FIG. 2 and taken generally on the line 4—4 of FIG. 1;

FIG. 5 is a similar vertical section indicating a completely formed insulating joint obtained with the structure of FIG. 4;

FIG. 6 is an exploded view, partly in perspective and partly in elevation, indicating a variation of both the method and the construction for an insulated joint of this invention;

FIG. 7 is a vertical section of the finished assembly obtained with the parts of FIG. 6;

Figure 8:
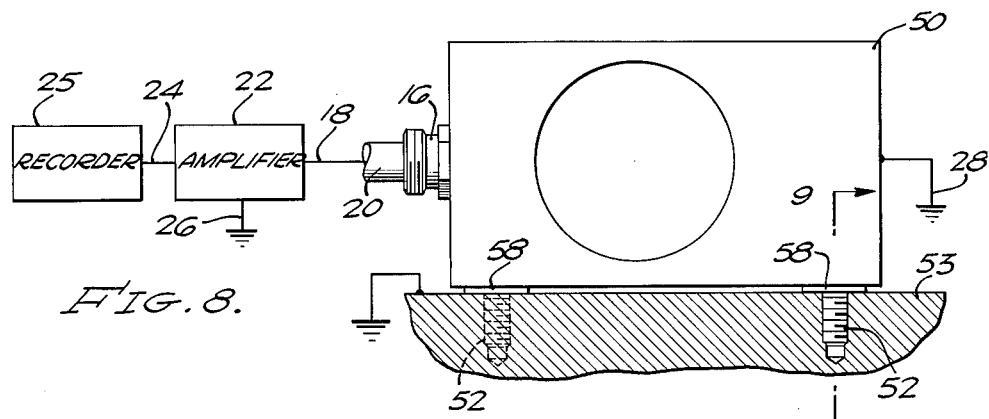
FIG. 8 is a view similar to that of FIG. 1, disclosing an arrangement for an insulating joint, within the scope of this invention, employed for anchoring a type of test equipment different from that of FIG. 1.
Figure 9:
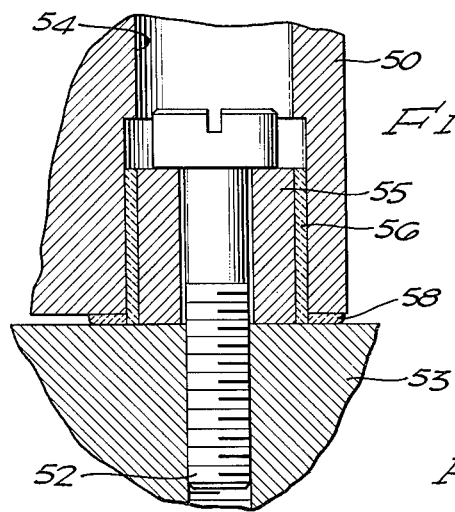
FIG. 9 is a vertical sectional detail, on an enlarged scale, taken from the line 9—9 of FIG. 8.

Referring to the form of the invention indicated in FIG. 1, an accelerometer having a housing 10 and a base 12 is shown as being mounted upon the housing or framework of the apparatus 14 to be tested, this mounting being effected by means of a double-ended headless screw 15 having its upper end tightly threaded into the underside of the accelerometer base 12 and its lower end tightly threaded into a corresponding seat in the apparatus 14. The accelerometer base 12 carries a fitting 16 which recesives one end of a typical coaxial cable 21 including a center lead 18 and an outer grounded shield 20, such cable leading, for example, to an amplifier 22 which is connected, in turn, by a line 24 to a recorder 25. The amplifier 22 is provided with some form of ground connection 26, and the apparatus with a ground connection 27.

An accelerometer of the type to which the present invention is applicable is illustrated very schematically in FIG. 2. As indicated there, a pair of oppositely polarized piezoelectric discs 78 are mounted between the base 12 and an inertial member or mass 80 which is mounted in spaced relationship from the top of a rigid case 82 by a soft spring 84. In the present instance, the base 12, the case 82, the inertial member 80, and the spring 84 are all composed of metal and are electrically connected together and to the shield 20 of the cable 21. These parts, therefore, are also in electrically conductive relationship with the outer faces of the two piezoelectric discs 78. The inner faces of the piezoelectric discs 78 are connected to an intervening metallic disc 86 which is electrically connected to the central conductor 22 of the cable 21. Another accelerometer to which this invention is applicable is described in Patent No. 2,714,672 which issued to H. Dudley Wright et al., August 2, 1955. With such an accelerometer, when the structure upon which it is mounted is vibrating, electric potentials are generated across the faces of the piezoelectric discs 58, and these electric potentials are applied across the two conductors 18 and 20.

A central portion of the base 12 is provided with a cylindrical bore 30 whose internal end receives and holds an insulating disc of mica 32 or the like. The bore 30 also receives a cylindrical nut or sleeve 34 provided with coaxial threads 35 to receive the upper end of the mounting screw 15 and having on its outer cylindrical surface a thin, hard, tenacious, and permanent coating of insulating ceramic 36.

The ceramic coating 36 is applied as a molten ceramic spray at very high temperatures, perhaps around 3,000° F. to 4,000° F., and the result is a coating having very high insulating properties and which, in addition to being quite hard, is permanent and extremely tenacious. The average thickness of such a coating is about 0.005" to about 0.010" each. The coated sleeve 34 is capable of being shrunk fit into the bore 30, which is accomplished in the usual manner, as by, for example, heating the base 12 to 600° F. or 700° F., slipping the coated sleeve 34 into the bore 30, and allowing the base 12 to cool and shrink, thus permanently binding the coated sleeve 34 in the operative position illustrated in FIG. 4. When the coated sleeve 34 has been shrunk in operative position with the mica layer 32 insulating the inner end of the sleeve, the outer surface of the base 12 and of the coated sleeve 34 is now spray coated with the same ceramic coating material as before at the same high temperature, whereby to provide an outer ceramic layer indicated at 38 in FIG. 5. Thereupon the projecting outer end of the coated sleeve 34 is smoothed off to produce an even surface of the whole unit as seen in FIG. 5. During the spraying, the threads 35 will of course have been protected from the spraying material.

When the over-spray insulating coating 38 has been completed and the end of the unit finished down to the level indicated in FIG. 5, the threads 35 in the sleeve 34 are now ready for application to the upper end of the mounting screw 15 whose inner extremity is then insulated from the base 12 by the internal mica layer 32 and the coating 36, and the base 12 is further insulated from the structure 14 by the coating 38. The coatings not only provide excellent electrical insulation, but also excellent mechanical connection. In some cases, the coating 38 may be omitted and the nut used without such coating, as shown in FIG. 4, and the insulation 32 and 36 relied upon to establish the desired electrical and mechanical characteristics.

An important modification of this same type of mounting means is illustrated in FIGS. 6 and 7. Here the base 12 is provided with the bore 30 as before, and the threaded nut-like metal sleeve 34 is again used but is mounted in a considerably different manner.

In this form, the outer face of the base 12 and also the cylindrical wall and bottom of the bore 30 are provided with an over-spray or coating 40 of the same ceramic material as used for the previously described coatings 36 and 38. There is then applied upon the coating 40 an over-spray or coating 42 of a solderable metal, such as tin.

This metal 42 is sprayed upon the ceramic layer 40 in molten form at high temperature and thereby becomes firmly bonded mechanically with the ceramic layer 40. The threaded sleeve 34 is now readily soldered in place within the lined bore 30 by reason of the solderable metal layer 42, in accordance with conventional soldering procedures. The result is a rigid anchoring of the nut-like sleeve 34 in the bore 30 with a different, but similar, joint corresponding with that of FIG. 5.

Both of the above described mountings thus insulate the base 12 from the sleeve 34 and from the apparatus 14, when mounted thereon, this effect being partly accomplished by the over-spray coating 38 in one case and entirely accomplished by the over-spray coating 40 in the other case.

Another type of mounting construction which relies largely upon the same type of insulating ceramic coating as above described is illustrated in FIGS. 8 to 11, where through-bolts or the like are used to bolt the housing of a test instrument to the housing of the apparatus 14. As shown in FIG. 8, a housing 50 of a larger test instrument than the device 10, 12 is bolted by appropriate bolts or machine screws 52 to apparatus 53 to be tested, the details of such mounting being illustrated in FIG. 9.

As with the assemblage of FIG. 1, the instrument 50 is connected with the amplifier 22 by way of the fitting 16 and the coaxial cable 18, 20, and the amplifier 22 is connected by the line 24 with the recorder 25, the various parts being grounded at 26, 27 and 28 as before.

With this type of construction, the test instrument housing 50 is provided with through stepped bores 54 which receive the bolts or screws 52 when being installed. To provide an insulated seat and mounting for each screw 52 and its head, a metal seating sleeve 55 is rigidly mounted in the lower end of the bore 54 by a shrunk fit embodying a ceramic coating 56 on the cylindrical wall of the sleeve 55, which coating 56 is rigidly and permanently gripped between the walls of the housing 50 and the sleeve 55 by reason of the shrunk fit, as in the case of the structure of FIGS. 4 and 5.

The ends of the sleeve 55 and its ceramic coating 56 project somewhat beyond the housing 50, as was the case in FIGS. 4, 5 and 6, and a molten ceramic coating 58 is now sprayed on the face of the housing, at least in an area around each bolt or screw 52, so that such coating acts as an insulation between the instrument housing 50 and the apparatus 53 when mounted. The exposed surfaces of the sleeve 55 and the ceramic layers 56 and 58 are leveled off as shown to yield a finished face of the instrument. Here, the head of each screw 52 bears upon the top of the sleeve 55 in spaced relation to the walls of the bore 54, so that the ceramic layers 56 and 58 insulate the screw 52 from the instrument housing 50.

Figure 10:
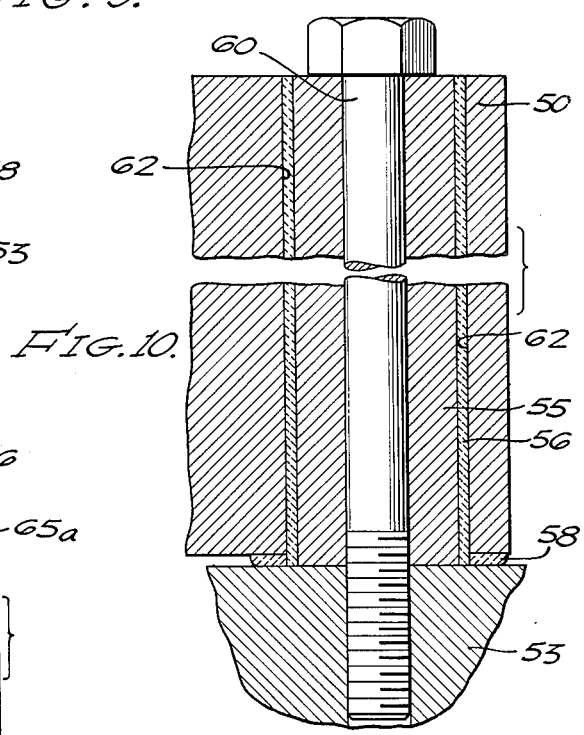
FIG. 10 is an enlarged vertical section illustrating another arrangement for mounting the test instrument of FIG. 8.

Another form for bolt or screw attachment is shown in FIG. 10 where a bolt 60 passes through a through bore 62 and is threaded into the apparatus housing 53. Here the bolt 60 passes through a centering sleeve 55 having a ceramic coating 56, as before, this whole unit being anchored in the bore 62 throughout its entire length by a shrink fit as in FIG. 9, and a ceramic layer 58 being applied to the face of the housing 50 around the bolt 60, as in FIG. 9.

In this case, however, the head of the bolt 60 is positioned outside the housing 50 and overhangs the latter.

Figure 11:
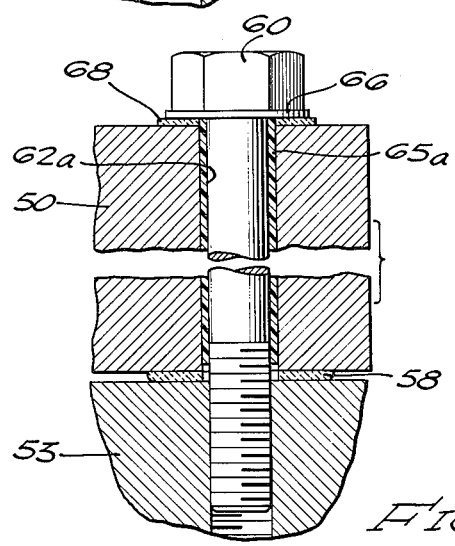
FIG. 11 illustrates still another useful joint for the same purpose.

In FIG. 11, another variation is shown. There the insulating sleeve 56 is omitted and a plastic sleeve 65a extends all the way through the bore 62a to insulate the bolt 60. However, the ceramic layer 58 is still employed on the face of the housing 50 around the bolt 60 to insulate the latter from the apparatus 53. Additionally, a ceramic layer 68 is applied to the top surface of the housing 50 under the head of the bolt 60, and a metal washer 66 is used between the bolt head and the insulation layer 68.

Thus, with all these forms, a layer of ceramic material, sprayed on the various surfaces, serves as insulation between the test instrument housing and the apparatus being tested or being used in the test.

I claim:

1. In combination:
    a vibration detector having detecting means for generating electrical signals in response to vibration of an object on which the detector is mounted;
    a base structure carrying said detector and having an outer wall surface to be mounted on said object during testing, and also having a bore extending into said base structure from said outer surface and providing inner wall surfaces to receive attachment means;
    ceramic insulation permanently disposed on said outer wall surface and on inner wall surfaces of said bore; and
    attachment means fixedly disposed within and surrounded by said ceramic insulation on said inner wall surfaces and insulated from said base structure by such ceramic insulation.

2. A mounting as in claim 1 wherein said base structure bore provides a bottom wall and a layer of insulating material is applied to said bottom wall.

3. A combination as in claim 1 wherein said attachment means is a bored annular element tightly adhered to said ceramic insulation.

4. A mounting as in claim 3 wherein a layer of solderable metal is applied in permanently adhering relation to said ceramic insulation on said inner wall surfaces, and said bored annular element is soldered to said solderable metal layer.

5. A mounting as in claim 3 wherein said bored annular element projects outwardly from said base structure beyond said outer wall surface thereof.

6. A combination as in claim 3 wherein said annular attachment element is tightly held in said insulation by a shrink fit.

7. A combination as in claim 1 wherein said base structure is provided with means to receive a torque-applying tool.

References Cited in the file of this patent

UNITED STATES PATENTS

| | | |
|---|---|---|
| 255,043 | Smith | Mar. 14, 1882 |
| 1,110,947 | Lampert | Sept. 15, 1914 |
| 1,674,258 | Obergfell et al. | June 19, 1928 |
| 1,864,351 | Hendee | June 21, 1932 |
| 2,480,523 | Tubbs | Aug. 30, 1949 |
| 2,770,669 | Smith | Nov. 13, 1956 |
| 2,824,243 | Sargeant | Feb. 18, 1958 |
| 2,897,386 | Jones | July 28, 1959 |

FOREIGN PATENTS

| | | |
|---|---|---|
| 665,544 | Great Britain | Jan. 23, 1952 |